United States Patent [19]

Akin

[11] Patent Number: 4,565,104

[45] Date of Patent: Jan. 21, 1986

[54] LINEAR ACTUATOR FOR LARGE-ANGLE MOTIONS

[75] Inventor: Thomas A. Akin, Smyrna, Ga.

[73] Assignee: Scientific-Atlanta, Inc., Atlanta, Ga.

[21] Appl. No.: 420,033

[22] Filed: Sep. 20, 1982

[51] Int. Cl.[4] ............ F16H 27/02; F16H 29/02; F16H 29/20; F16H 21/45

[52] U.S. Cl. ............ 74/89.15; 74/102; 74/99 R; 74/96; 74/89

[58] Field of Search ............ 74/102, 99, 96, 89, 74/89.15

[56] References Cited

U.S. PATENT DOCUMENTS

| | | | |
|---|---|---|---|
| 3,726,029 | 4/1973 | Deen et al. | 74/30 |
| 3,774,462 | 11/1973 | Thompson | 74/89.15 |
| 3,864,869 | 2/1975 | Leuenberger | 74/99 R |
| 3,874,245 | 4/1974 | Král et al. | 74/89.15 |
| 4,050,318 | 9/1977 | Wolf | 74/89.15 |
| 4,061,049 | 12/1977 | Beurrier | 74/89.15 |
| 4,251,819 | 2/1981 | Vickland | 343/882 |
| 4,282,763 | 8/1981 | Griebeler | 74/99 R |
| 4,343,200 | 8/1982 | Alworth et al. | 74/89.15 |
| 4,381,166 | 4/1983 | Smart | 74/89.15 |
| 4,435,116 | 3/1984 | Van Deberg | 74/89.15 |

Primary Examiner—Lawrence J. Staab
Assistant Examiner—Michael D. Bednarek
Attorney, Agent, or Firm—Jones & Askew

[57] ABSTRACT

A linear actuator for rotating a load, such as an antenna, in which the load is pivoted about a load pivot axis and a drive point on an arm extending from the load is driven along a path of travel defined by a frame pivoted about a frame pivot axis parallel to the load pivot axis and normal to the path of travel, the load pivot axis being equally distant from the drive point and the frame pivot axis. The structure of the linear actuator reduces loss of moment arm at the extremes of travel and minimizes stress on the components of the actuator.

10 Claims, 9 Drawing Figures

LINEAR ACTUATOR FOR LARGE-ANGLE MOTIONS

TECHNICAL FIELD

The present invention relates to the translation of linear movement into rotational movement, and more particularly relates to a linear actuator for continuously driving a load through rotational angles of 180 degrees or more while maintaining a substantial moment arm at the extremes of travel.

BACKGROUND ART

Large loads, such as earth station antennas, have been rotated using a linear actuator, such as the extending rod of a hydraulic or pneumatic cylinder or a linear actuator screw. Conventionally, the linear actuator has been fixed at one end to an anchor pivot while the other end is attached to an arm extending from the anchor pivot of the driven load. As the actuator rod or screw extends and retracts, it rotates the driven load.

In such prior system, loss of moment arm near the extremes of travel of the actuator limits the maximum practical angle through which the load may be driven. Also, the size and strength of the actuator screw or rod must be selected to provide sufficient column stability of the actuator at full extension. This results in an inefficient, over-built mechanism for operation between the extremes of travel.

Thus a need has existed for a linear actuator which provides continuous rotational motion through angles of 180 degrees or more, which minimizes loss of moment arm at the extremes of rotational travel, and which does not depend for its strength upon column stability of the actuator at full extension thereof.

SUMMARY OF THE INVENTION

The present invention solves the above-described problems in the art by mounting the linear actuator in a geometric arrangement with respect to the driven load such that the path of travel defined by the linear actuator is pivoted intermediate its ends.

Generally described, the invention provides a linear actuator for rotating a load, comprising a frame defining a linear path of travel, the frame being pivoted intermediate the ends of the path of travel about a frame pivot axis intersecting the path of travel and normal thereto; load support means for supporting the load for pivotal motion about a load pivot axis parallel to and spaced apart from the frame pivot axis, the load support means including a drive arm extending to a drive point along the path of travel, the drive point and the frame pivot axis being equally distant from the load pivot axis; and means for driving the drive point of the drive arm along the path of travel.

The method according to the invention comprises the steps of pivoting the load about a load pivot axis; and driving a drive point on an arm extending from the load along a path of travel defined by a frame pivoted about a frame pivot axis parallel to the load pivot axis and normal to the path of travel, the load pivot axis being equidistant from the drive point and from the frame pivot axis.

The means for driving the drive point along the path of travel can be a threaded screw carrying a nut, a rack-and-pinion device, a cable-driven slide or a piston. A motor for operating the driving means can be carried for movement with the frame, or in the alternative, the driving means can be engaged only when movement of the load is required, either manually or by the application of an appropriate power source.

The frame pivot axis is preferably located at the midpoint of the frame. As a result, the frame rotates about the frame pivot axis through an angle of only 45 degrees while rotating the load through an angle of 90 degrees from an orientation in which the drive point is aligned with the frame a pivot axis. The moment arm when the load is thus rotated 90 degrees is over 70 percent of the maximum moment arm. Further rotation is possible, with similar preservation of moment arm compared to conventional devices. Total permitted angular rotation is limited only by the length of the frame and interference between the parts, and can extend well beyond 180 degrees.

Compression loads are taken by the frame, rather than by the linear driving means itself. Only one half of the frame length absorbs such compression loads, thereby minimizing the importance of column stability.

Thus, it is an object of the present invention to provide an improved linear actuator for rotating a load.

It is a further object of the present invention to provide a linear actuator for rotating a load that minimizes loss of moment arm at the extremes of rotational travel of the load.

It is a further object of the present invention to provide a linear actuator for rotating a load in which column stability of the actuator at maximum extension is not a critical factor in determining the strength of materials needed in building the actuator.

Other objects, features and advantages of the present invention will become apparent upon review of the following detailed description of embodiments of the invention, when taken in conjunction with the drawing the appended claims.

DETAILED DESCRIPTION

Figure 1:
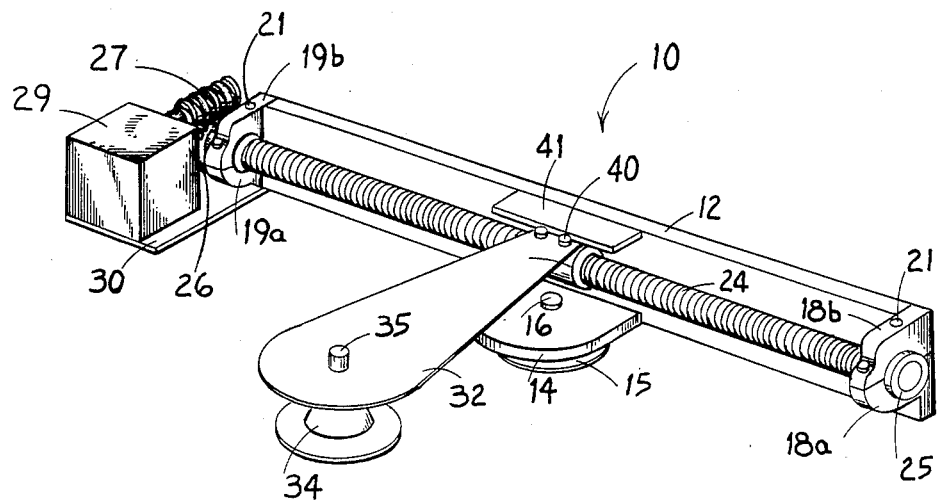
FIG. 1 is a pictorial view of a linear actuator apparatus embodying the present invention.

Referring now in more detail to the drawing, in which like reference numerals represent like parts throughout the several views, FIG. 1 shows a first embodiment of a linear actuator apparatus 10 according to the present invention. The actuator 10 includes an elongate horizontally extending frame 12. A support flange 14 extends horizontally from the lower central portion of the frame 12 and is pivotally mounted on a pivot shaft 16 extending vertically from a frame base 15. Thus, the entire frame 12 pivots about the frame pivot axis defined by the shaft 16 in a horizontal plane.

Figure 4:
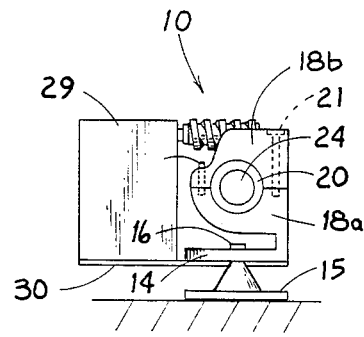
FIG. 4 is an end view taken along line 4—4 of FIG. 3.

At opposite ends of the frame 12, a pair of bearing extensions 18 and 19 extend horizontally from the frame 12 in the same direction as the support flange 14. The bearing extensions include lower extensions 18a, 19a which can be integrally formed with the frame 12, and removable upper bearing extensions 18b, 19b. As shown in FIG. 4 the bearing extensions define an opening for receiving and clamping bearings 20, the upper bearing extensions 18b, 19b being fixed to the lower extensions 18a, 19a, by screws 21. A linear actuator screw 24 is journalled within the bearing 20 for rotation about a horizontal axis that passes directly over the shaft 16. Lock rings 25 positioned on the screw 24 outside the bearing extensions retain the screw 24 in place.

Figure 5:
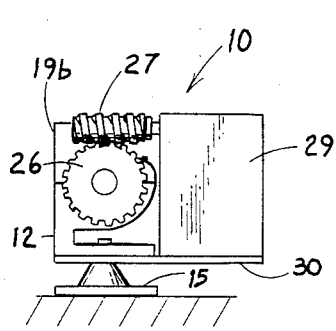
FIG. 5 is an opposite end view taken along line 5—5 of FIG. 3.

At one end of the screw 24, a circular gear 26 is attached to the end of the screw 24. A pinion gear 27 is mounted to engage the periphery of the circular gear 26 and to be driven by a motor 29, as shown in FIG. 5. The motor 29 is preferably reversible and is mounted on a platform 30 which is connected to the frame 12. Thus, the motor 29 pivots with the frame 12 and can rotate the actuator screw 24 about its axis throughout the pivotal movement of the frame 12.

Figure 6:
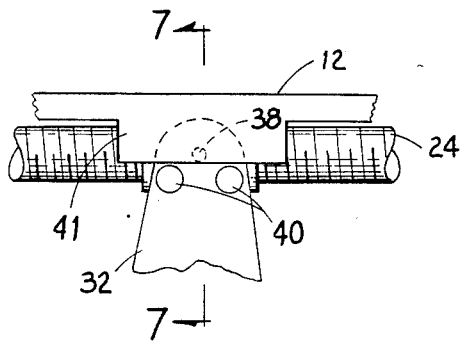
FIG. 6 is a fragmentary top view of the linear actuator of FIG. 1, showing the load bearing arm at its central or neutral position along the screw.
Figure 7:
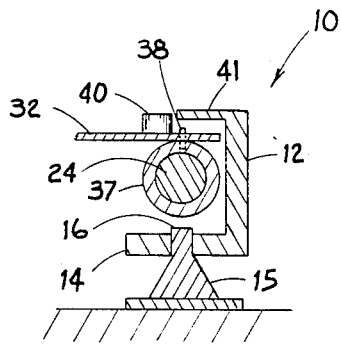
FIG. 7 is a side cross sectional view taken along line 7—7 of FIG. 6.

The load to be rotated, such as an earth station antenna, is carried by a load bearing arm 32. The arm 32 is pivotally mounted adjacent one end thereof to a shaft 35 extending vertically from a load arm base 34. The load pivot axis defined by the shaft 35 is parallel to and spaced apart from the axis defined by the shaft 16. The arm 32 is pivotally connected adjacent to its other end to a vertical shaft 38 which extends slightly upwardly from a nut 37 threadably engaged for travel along the actuator screw 24. The base 34 is positioned such that the distance between the shaft 35 and the shaft 38 is equal to the distance between the shaft 35 and the shaft 16. Thus, as the actuator screw 24 is turned, the nut 37 travels along the screw 24, causing the frame 12 to pivot about the shaft 16 as the load arm 32 (and supported load) rotate about the shaft 35. When the nut 37 reaches the center of the screw 24, so that the shaft 38 is aligned with the shaft 16, the apparatus is in a neutral position in which the frame 12 is not prevented from freely rotating about the shaft 16, if not restrained. As shown in FIGS. 6 and 7, such free movement is restrained by the provision of circular stops 40 positioned on the load arm 32 on opposite sides of the shaft 38 so as to cooperate with an abutment 41 extending horizontally from the upper central portion of the frame 12.

Figure 2:
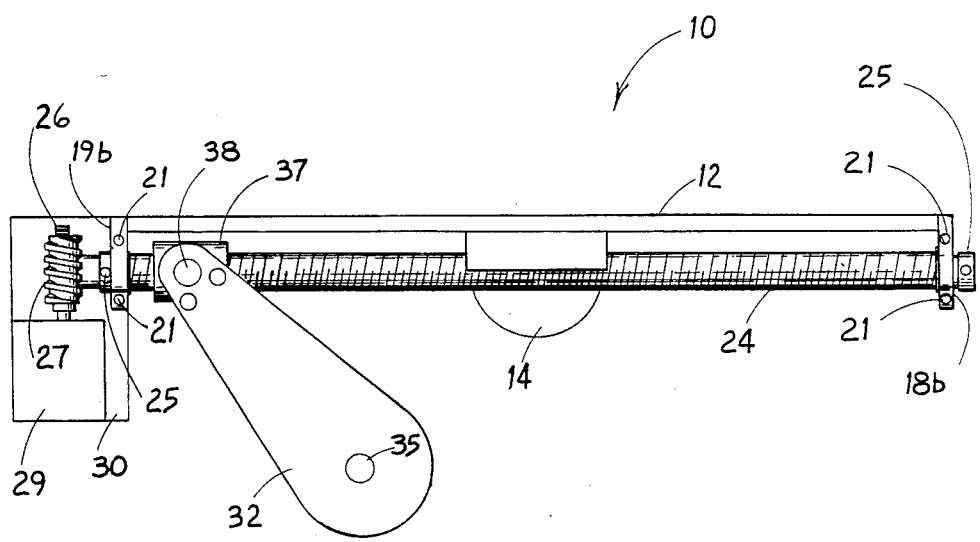
FIG. 2 is a top plan view of the linear actuator of FIG. 1.
Figure 3:
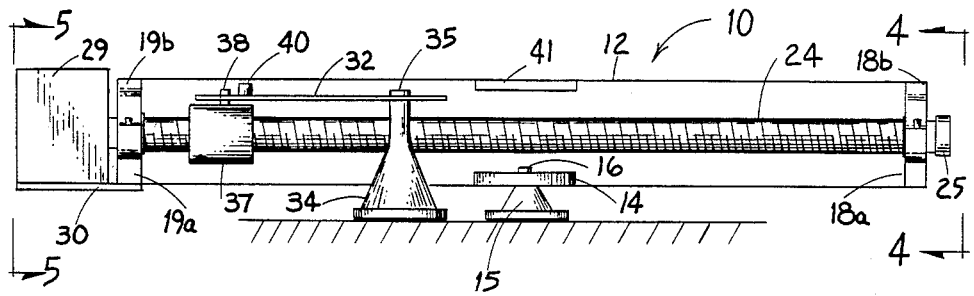
FIG. 3 is a front plan view of the linear actuator shown in FIG. 1.

In operation of the first embodiment of the invention, shown in FIGS. 1-7, power is connected to the motor 29 by means of cables (not shown) or the like having sufficient slack to allow free movement of the motor 29 with the frame 12. Operation of the motor 29 rotates the pinion gear 27 which imparts motion to the circular gear 26 and therefore to the actuator screw 24. FIG. 2 shows one extreme rotational position of the load arm 32 permitted by the actuator apparatus 10. This extreme position is rotated 90 degrees from the neutral position shown in FIG. 6. It will be understood that by lengthening the frame 12 and actuator screw 24, the extreme position of the load arm 32 could be extended beyond 90 degrees from the neutral position to be limited only by physical interference between the load arm 32 and the frame 12 or screw 24.

At the 90 degree position shown in FIG. 2, an angle of 45 degrees is formed between the screw 24 and the load arm 32. Thus, the moment arm is slightly in excess of 70 percent of the moment arm when the load arm 32 is in the neutral position, that is, perpendicular to the screw 24.

Loads exerted on the actuator are less severe than in prior devices. The actuator screw 24 is always in tension regardless of the direction in which the screw 24 is rotated. The screw need be sized only for tension load rather than for column stability at full extension. Compression loads are taken by the frame 12, which has a large cross section relative to the screw 24, and a column length equal to one half the length of the frame, which is a relatively short column length eliminating column stability problems.

As the nut 37 travels toward the neutral position, the angle between the screw 24 and the load arm 32 increases, as does the moment arm. As the nut 37 approaches the neutral position, the stops 40 engage the abutment 41, without interfering with the movement of the nut 37 along the screw 24. However, the stops 40 prevent free rotation of the frame 12 about the pivot 16 when the shaft 38 is directly above the shaft 16. The nut 37 can pass continuously through the neutral position so as to rotate the load arm 32 through an equal angle in the other direction.

Figure 8:
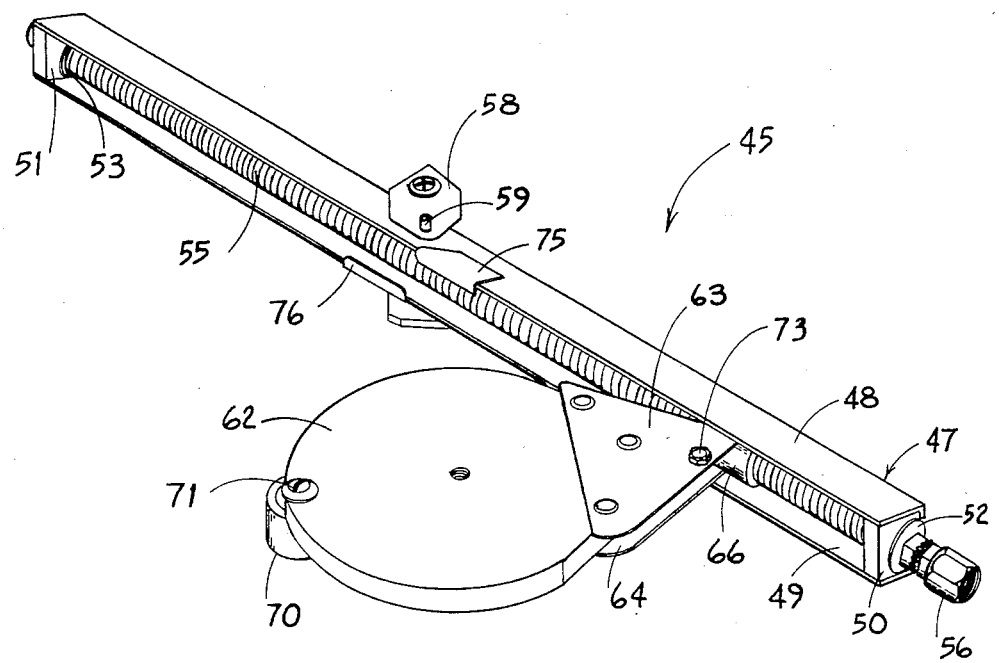
FIG. 8 is a pictorial view of a second embodiment of a linear actuator embodying the present invention.

FIG. 8 shows a pictorial view of a second embodiment of a linear actuator 45 embodying the present invention. The linear actuator 45 includes an elongate rectangular frame 47 having horizontal upper and lower plates 48 and 49 connected by vertical end walls 50 and 51. The end walls retain bearings 52 and 53 through which are journalled an elongate actuator screw 55. The screw 55 extends through the end wall 50 and defines a tool-engaging member 56 at the end of the screw. The member 56 can be, for example, a hexagonal head bolt that can be engaged by a wrench or the like for turning the screw 55. It will be understood that a means for rotating the screw could be mounted for movement with the frame 47, similar to the motor 29 of the first embodiment.

Figure 9:
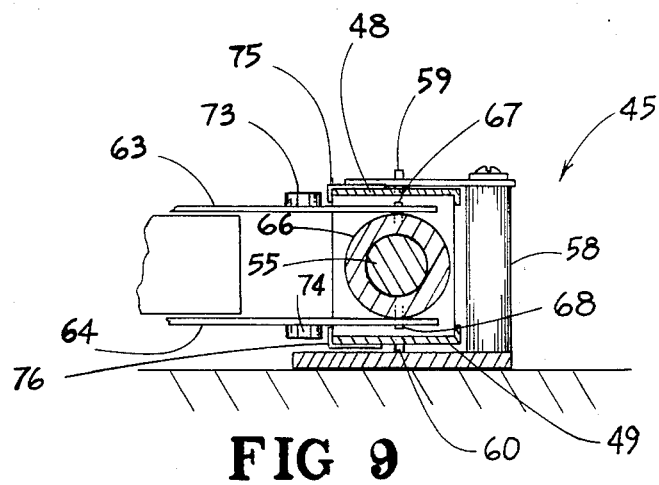
FIG. 9 is a side cross sectional view taken along line 9—9 of FIG. 8 but showing the load bearing arm in the neutral position.

The frame 47 is pivotally mounted for rotation about a vertical axis by a U-shaped base 58. The base 58 opens horizontally to receive to frame 47, and includes pivot pins 59 and 60 that are colinear and engage the frame members 48 and 49, respectively at the midpoint along their lengths. The axis defined by the pivot pins 59 and 60 passes through the axis of the screw 55. This is best shown in FIG. 9, which is a cross sectional view similar to FIG. 7.

A load bearing arm 62 includes upper and lower drive extensions 63 and 64. Such extensions pass over and under the screw 55 and are pivotally connected to a nut 66 by an upper shaft 67 and a lower shaft 68. The nut 66 is threaded onto the screw 55 and moves along the screw in response to rotation of the screw. The load arm 62 is pivotally mounted at its end opposite the nut 66 on a vertical shaft 71 which extends upwardly from a load arm base 70. In order to prevent free rotation of the frame 47 when the nut 66 is in the neutral position, as shown in FIG. 9, a stop 67 is positioned extending upwardly from the upper drive extension 63 to engage an upper abutment 75 that is mounted on the upper plate 48 of the frame 47. Correspondingly, a lower stop 74 extends downwardly from the lower drive extension 64 and engages a lower abutment 76 that is mounted on the lower plate 49 of the frame 47.

Operation of the linear actuator 45 is similar to that described above for the linear actuator 10. The moment arm is maximized and the forces are absorbed in the same manner as described above.

In order to prevent the weight of the load from exerting a downward bending force upon the actuator screw 24 or 55, the load can be centered about the load arm base shaft 35 or 71, or a moveable support, such as a roller (not shown), can be mounted to the underside of the load arm 32 or 62 between the shaft 35 or 71 and the actuator screw. Such a moveable support would not affect the movement of the nut 37 or 66 along the screw.

Although linear actuation in the embodiments described is accomplished by movement of a nut along a screw, other means for linear actuation can be utilized. For example, a piston cylinder can be mounted at one end of the frame so as to extend a rod connected to the load arm along the frame. Alternately, a rack could be mounted along the frame to be engaged by a pinion selectively activated to travel along the rack. A cable-driven slide mechanism could also be constructed to move the extending end of the load arm along the frame. In the embodiments shown, the nut could be caused to rotate in order to travel along the screw, instead of applying rotational force to the screw itself.

Although the present invention finds particular utility in supporting and rotating antennas, it will be understood that any appropriate load requiring rotation could be supported according to the invention. Furthermore, although the embodiments described provide rotation in a horizontal plane, the concepts of the invention can be applied in other orientations for rotation of a load about non-vertical axes.

It will thus be seen that the present invention provides an economical means of driving a load through large azimuth angles of 180 degrees or more in one continuous motion. The device is especially useful where high loads are involved and a rigid load path is required. Loss of moment arm near the extremes of travel of the actuator, common to prior devices, has been minimized, as has the need for excessive strength of materials needed only for safe operation at the extremes of travel.

While this invention has been described in detail with particular reference to preferred embodiments thereof, it will be understood that other variations and modifications can be made without departing from the spirit and scope of the invention as defined in the appended claims.

What is claimed is:

1. A linear actuator for rotating a load comprising:
   a frame defining a linear path of travel, said frame being pivoted intermediate the ends of said path about a frame pivot axis intersecting said path and normal thereto, said frame pivot axis dividing said path into a first path segment extending on one side of said frame pivot axis and a second path segment extending on the opposite side of said frame pivot;
   load support means for supporting said load for pivotal motion about a load pivot axis parallel to and spaced apart from said frame pivot axis, said load support means including a drive arm extending to a drive point along said path of travel, said drive point and said frame pivot axis being equidistant from said load pivot axis; and
   means for driving said drive point of said drive arm along said path of travel from a first location in said first path segment through said frame pivot axis to a second location in said second path segment.

2. The apparatus of claim 1, wherein said drive arm includes a nut pivotally connected to said drive arm at said drive point; and wherein said means for driving said drive point comprises a rotatable screw mounted in said frame along said path of travel, said nut being threadably received on said drive screw and moving linearly along said screw upon rotation thereof.

3. The apparatus of claim 2, further comprising means, movable with said frame, for selectively axially rotating said screw in either rotational direction.

4. The apparatus of claim 3, wherein said frame comprises at least one side member extending adjacent to said screw; a pair of end members extending from said side member and including bearings for receiving the ends of said screw; and a shaft pivotally mounted to a base to define said frame pivot axis.

5. The apparatus of claim 4, further comprising stop means, mounted on said drive arm and on said frame, for preventing free rotational movement of said frame about said frame pivot axis when said drive point intersects said frame point axis.

6. The apparatus of claim 5, wherein said stop means comprises:
   a pair of stop members mounted on said drive arm spaced apart along the direction of said path of travel, one of said stop members being positioned on each side of said drive point; and
   abutting surface means defined by said side member such that when said drive point intersects said frame pivot axis, both said stop members are positioned closely adjacent to said abutting surface means, whereby rotation of said frame about said frame pivot axis is prevented until such drive point is driven away from said frame pivot axis.

7. The apparatus of claim 6, wherein said frame comprises upper and lower side members extending adjacent to said screw, and wherein said abutting surface means comprises a pair of abutting surfaces one defined by each of said side members.

8. The apparatus of claim 1, wherein said driving means comprises means for driving said drive point along said path of travel such that a line between said load pivot axis and said frame pivot axis sweeps through an angle of at least 180 degrees.

9. The apparatus of claim 1, further comprising:
   a pair of stop members mounted on said drive arm spaced apart along the direction of said path of travel, one of said stop members being positioned on each side of said drive point; and
   abutting surface means defined by said frame such that when said drive point intersects said frame pivot axis, both said stop members are positioned closely adjacent to said abutting surface means, whereby rotation of said frame about said frame pivot axis is prevented until said drive point is driven away from said frame pivot axis.

10. A method of rotating a load comprising the steps of:
    pivoting said load about a load pivot axis; and
    driving a drive point on an arm extending from said load along a path of travel defined by a frame pivoted intermediate the ends thereof about a frame pivot axis parallel to said load pivot axis and normal to said path of travel, said frame pivot axis dividing said path of travel into a first path segment on one side of said frame pivot axis and a second path segment on the opposite side of said frame pivot axis, and said drive point being driven from a first location in said first path segment through said frame pivot axis to a second location in said second path segment, said load pivot axis being equidistant from said drive point and said frame pivot axis.

* * * * *